United States Patent
Li (10) Patent No.: US 10,209,753 B2
(45) Date of Patent: Feb. 19, 2019

(54) INTELLIGENT POWER SERVER APPLIED TO PROTECTION AND CONTROL SYSTEM FOR INTELLIGENT SUBSTATION

(71) Applicant: Kyland Technology Co., Ltd., Beijing (CN)

(72) Inventor: Ping Li, Beijing (CN)

(73) Assignee: Kyland Technology Co., Ltd, Beijing (CN)

( * ) Notice: Subject to any disclaimer, the term of this patent is extended or adjusted under 35 U.S.C. 154(b) by 165 days.

(21) Appl. No.: 15/404,523

(22) Filed: Jan. 12, 2017

(65) Prior Publication Data
US 2018/0088643 A1 Mar. 29, 2018

(30) Foreign Application Priority Data
Sep. 29, 2016 (CN) .......................... 2016 1 0866110

(51) Int. Cl.
H02J 13/00 (2006.01)
G06F 1/26 (2006.01)

(52) U.S. Cl.
CPC ............ *G06F 1/26* (2013.01); *H02J 13/0062* (2013.01); *Y02E 60/723* (2013.01); *Y02E 60/7838* (2013.01); *Y04S 10/16* (2013.01); *Y04S 40/124* (2013.01)

(58) Field of Classification Search
CPC ................................................ H02J 13/0062
See application file for complete search history.

(56) References Cited

U.S. PATENT DOCUMENTS

| 2008/0262820 | A1 | 10/2008 | Nasle | |
|---|---|---|---|---|
| 2010/0153036 | A1* | 6/2010 | Elwarry | G01R 21/133 702/62 |
| 2015/0318739 | A1* | 11/2015 | Oda | H02H 7/261 700/292 |

FOREIGN PATENT DOCUMENTS

| CN | 102545387 A | 7/2012 |
|---|---|---|
| CN | 105515189 A | 4/2016 |
| WO | 2010118550 A1 | 10/2010 |
| WO | 2012015508 A1 | 2/2012 |

OTHER PUBLICATIONS

P Bartal, European Search Report, European Patent Application No. EP 16207224, dated Aug. 1, 2017, 7 pages, European Patent Office, Munich Germany.

* cited by examiner

*Primary Examiner* — Albert Wang
(74) *Attorney, Agent, or Firm* — Crain, Caton and James (57) ABSTRACT

The application relates to an intelligent power server applied to a protection and control system for an intelligent substation. According to the application, merging unit and intelligent terminal integrated devices for all bays in the intelligent substation are directly accessed to the intelligent power server. Each merging unit and intelligent terminal integrated device is accessed to one of transport ports on the intelligent power server through an embedded high-bandwidth switched communication network. The intelligent power server realizes measurement and control and protection functions of primary devices throughout the substation and exchange of total station information and a telecontrol function.

16 Claims, 4 Drawing Sheets

INTELLIGENT POWER SERVER APPLIED TO PROTECTION AND CONTROL SYSTEM FOR INTELLIGENT SUBSTATION

CROSS-REFERENCE TO RELATED APPLICATIONS

This application claims priority to Chinese patent application No. 201610866110.5, filed on Sep. 29, 2016, which is incorporated by reference herein in its entirety.

TECHNICAL FIELD

The disclosure relates to the technical field of intelligent substations, and in particular relates to an intelligent power server applied to a protection and control system for an intelligent substation.

BACKGROUND

An intelligent substation is a substation having primary and secondary devices of the substation as intelligent objects, and capable of realizing information sharing and interoperation by standardizing intelligent information based on a high-speed network communication platform and also capable of realizing automation functions such as measurement monitoring, control and protection, information management and the like based on network data.

The intelligent substation includes a station level, a bay level and a process level, and effective contact is mainly performed among different levels through optical cables. Each level includes different systems, devices and apparatuses which co-act and are cooperated with one another. The station level needs to record and collect electrical energy and related operating data of the substation in real time and is a platform allowing operators to know an operating state of the intelligent substation all the time. The bay level mainly includes secondary devices such as a measurement and control apparatus or a protection apparatus, and mainly completes measurement, control and protection of the devices on the process level.

In the related art, the substation is divided into a high-voltage line part, a main transformer part and a medium voltage side part. Each part is further divided into different device bays. Because the protection apparatuses are classified according to the device bays divided by functions, a plurality of types of protection apparatuses may exist in each bay of the substation. If N types of protection apparatuses exist at a bay, intelligent terminals and merging units for the bay need to be respectively connected to the protection apparatuses through N lines. Therefore, due to numerous secondary devices on the bay level, floor space of the secondary devices is large, and debugging and maintenance workload is relatively high. Moreover, wiring on the process level is complicated and tedious, and difficulty of construction is high, so that the cost of the whole substation is high.

The intelligent terminals stated above are intelligent assemblies. The intelligent terminals are connected to primary devices, such as a circuit breaker, knife switch and main transformer and the like, through cables, and connected to secondary devices for protecting, measuring and controlling and the like through optical fibers, so as to achieve measurement function, control function and the like over the primary devices. Specifically, the intelligent terminals mainly have the following functions:
  receiving control instructions for trip protection and tripping;
  receiving and executing opening/closing control instructions from a measuring and control device;
  uploading position signals of knife switches;
  collecting and uploading temperature data/humidity data.

SUMMARY

In view of this, embodiments of the disclosure provide an intelligent power server applied to a protection and control system for an intelligent substation, so as to solve the technical problems of numerous secondary devices, large floor space and high difficulty of construction and maintenance in the related art.

Embodiments of the disclosure provide an intelligent power server applied to a protection and control system for an intelligent substation. Merging unit and intelligent terminal integrated devices for all bays in the intelligent substation are directly accessed to the intelligent power server. Each of the merging unit and intelligent terminal integrated devices is accessed to one of transport ports on the intelligent power server through an embedded high-bandwidth switched communication network, and the intelligent power server includes:

An intelligent power server applied to a protection and control system for an intelligent substation, merging unit and intelligent terminal integrated devices for all bays in the intelligent substation are directly accessed to the intelligent power server, each of the merging unit and intelligent terminal integrated devices is accessed to one of transport ports on the intelligent power server through an embedded high-bandwidth switched communication network, and the intelligent power server includes a central processer chip, a switch chip and a storage device storing computer instructions which, when being executed, cause the central processer chip to implement functions of the following modules:
  a measurement and control module, configured to realize measurement and control over primary devices connected to the merging unit and intelligent terminal integrated devices for all bays in the intelligent substation and the merging unit and intelligent terminal integrated devices;
  a protect module, configured to realize protection for the primary devices connected to the merging unit and intelligent terminal integrated devices for all bays in the intelligent substation and the merging unit and intelligent terminal integrated devices;
  a telecontrol module, configured to collect measurement and control information and protection information generated in a measurement and control process and a protection process, transmit the measurement and control information and the protection information to an operator workstation, and execute a telecontrol control on the primary devices according to instructions from the operator workstation; and
  the switch chip is connected to the central processer chip, and is caused to implement functions of the following module when the computer instructions are executed:
  an exchange module, configured to realize data exchange between the merging unit and intelligent terminal integrated devices and devices on a process level, data exchange between the intelligent power server and the devices on the process level, data exchange between the intelligent power server and devices on a station level, data exchange among the devices on the process level and data exchange among the devices on the station level.

According to the intelligent power server applied to a protection and control system for the intelligent substation provided by embodiments of the disclosure, the merging unit and intelligent terminal integrated devices for all bays in the intelligent substation are directly accessed to the intelligent power server. The measurement and control module, the protect module, the telecontrol module and the exchange module are integrated in the intelligent power server, and special functions of measurement and control, protection, telecontrol, exchange and the like over the whole intelligent substation are integrated into one intelligent power server. Therefore, the measurement and control and protection functions of all the primary devices in the total substation, the exchange of total station information and telecontrol function can be realized. With the above technical solution, the quantity of the secondary devices in the substation and the floor space of the substation can be reduced, construction and maintenance difficulty of the substation is reduced, and a solution is provided for realizing cloud control, cloud service, energy big data and energy Internet of the substation. Meanwhile, popularization of the disclosure will promote fusion and deployment of a new technology of distribution network and micro-grid construction, and the technology greatly improves overall stability and reliability of the substation and provides a technical support for access diversity of power grid energy.

BRIEF DESCRIPTION OF DRAWINGS

In order to more clearly describe the technical solution of exemplary embodiments of the disclosure, the drawings to be used in descriptions of the embodiments are simply introduced below. Apparently, the introduced drawings are only drawings of a part of embodiments to be described in the disclosure, but not all of drawings. Those ordinary skilled in the art may obtain other drawings according to the drawings without paying creative work.

DETAILED DESCRIPTION

The disclosure is further described below in details in combination with the drawings and embodiments. It should be understood that, specific embodiments described herein are only used for illustrating the disclosure, not limiting the disclosure. In addition, it should be noted that, in order to conveniently describe, only a part of contents related to the disclosure, but not all of contents, are illustrated in the drawings.

It should be mentioned that, some exemplary embodiments are described to serve as processing or methods of flow chart description before the exemplary embodiments are discussed in details. Although various operations (or steps) are described into sequential processing in the flow chart, many operations therein can be implemented concurrently, concomitantly or simultaneously. In addition, a sequence of the various operations can be rearranged. The processing can be terminated when the operations are completed, however, the processing may further include additional steps which are not shown in the drawings. The processing can correspond to methods, functions, procedures, subroutines, subprograms and the like.

Embodiment I

Figure 1:
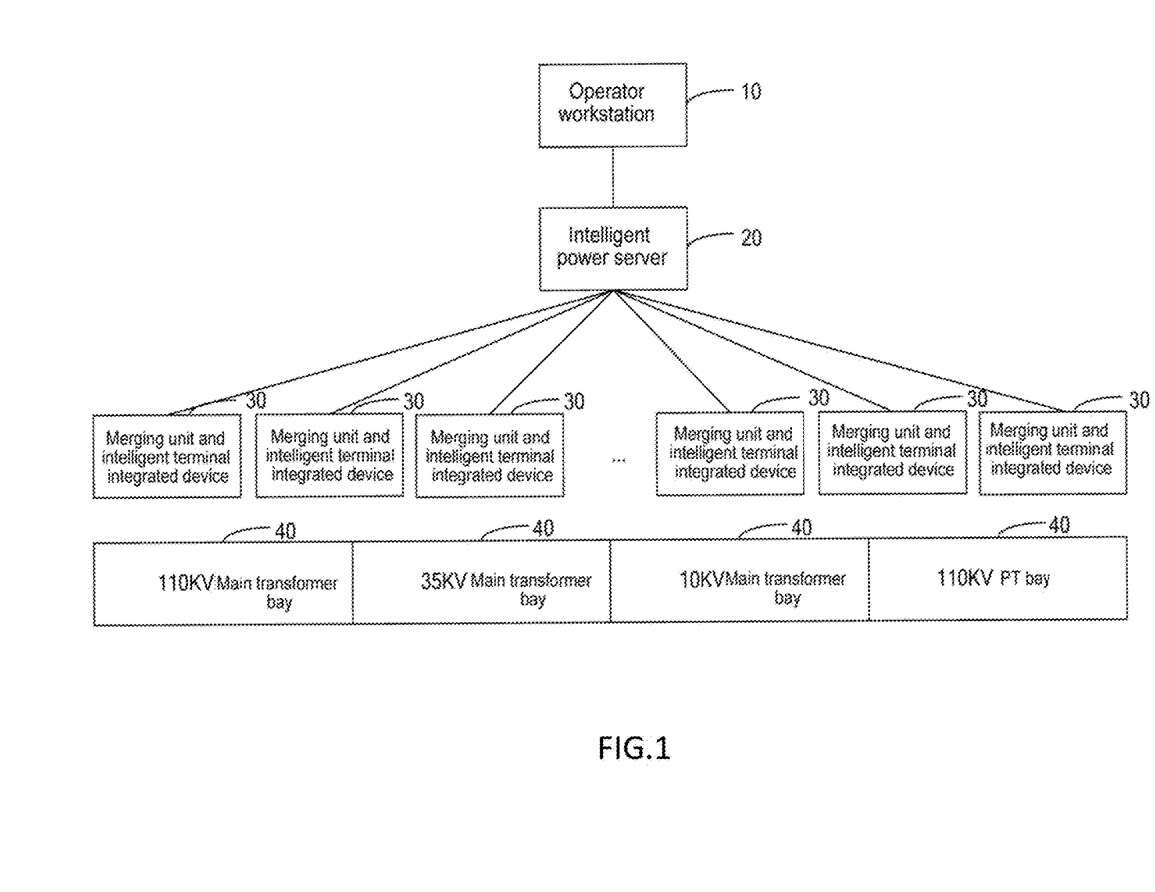
FIG. 1 is a structural schematic diagram illustrating a protection and control system for an intelligent substation provided by embodiment I of the disclosure.
Figure 2:
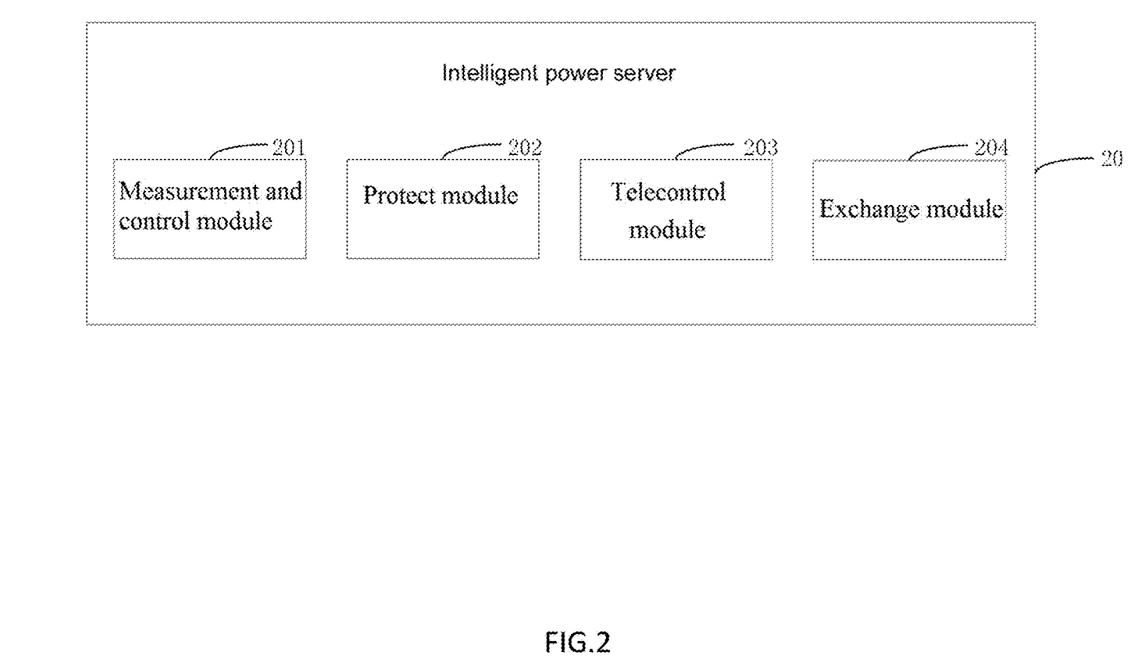
FIG. 2 is a structural schematic diagram illustrating an intelligent power server applied to a protection and control system for an intelligent substation provided by embodiment I of the disclosure.

FIG. 1 is a structural schematic diagram illustrating a protection and control system for an intelligent substation provided by embodiment I of the disclosure, and FIG. 2 is a structural schematic diagram illustrating an intelligent power server applied to a protection and control system for an intelligent substation provided by embodiment I of the disclosure. As shown in FIG. 1, the intelligent substation can include an operator workstation 10, an intelligent power server 20, merging unit and intelligent terminal integrated devices 30 and bays 40. The intelligent power server 20 can be connected to the operator workstation 10.

Merging unit and intelligent terminal integrated devices 30 for all bays in the intelligent substation are directly accessed to the intelligent power server 20, and each merging unit and intelligent terminal integrated device is accessed to a transport port on the intelligent power server through an embedded high-bandwidth switched communication network. For each of the merging unit and intelligent terminal integrated devices, it is accessed to one of transport ports on the intelligent power server through an embedded high-bandwidth switched communication network. The intelligent power server collects data of process level in real time in a manner of accessing each merging unit and intelligent terminal integrated device to one transport port on the intelligent power server through the embedded high-bandwidth switched communication network, completes real-time data processing on the collected data of process level, thereby realizing all the protection and measurement and control over the primary devices connected to the merging unit and intelligent terminal integrated devices. Specifically, the embedded high-bandwidth switched communication network may be a controller area network (CAN) bus, a field internet protocol (IP) bus, a Modbus bus, a process field bus (Profibus), a highway addressable remote transducer (HART) open communication protocol bus, a Foundation Field (FF) field bus or an optical fiber.

Illustratively, each merging unit and intelligent terminal integrated device 30 is accessed to one transport port on the intelligent power server 20 merely through one physical link. Specifically, each merging unit and intelligent terminal integrated device is connected to one transport port of the intelligent power server merely through a pair of optical fibers. One transport port of the intelligent power server includes a reception port and a transmission port. Each merging unit and intelligent terminal integrated device is accessed to the reception port of one transport port on the intelligent power server through one optical fiber, and accessed to the transmission port of the transport port on the intelligent power server through another optical fiber. The intelligent power server collects data of the process level in real time merely through one physical link. For example, the intelligent power server collects sampled value (SV) messages and generic object oriented substation event (GOOSE) messages transmitted by the merging unit and intelligent terminal integrated devices, and processes the data of the process level collected in real time in real time, thereby realizing all of the protection and measurement and control of the primary devices connected to the merging unit and intelligent terminal integrated devices.

The bays 40 can include main transformer bays, line bays and bus bays, and each bay 40 includes at least one merging unit and intelligent terminal integrated device 30.

As shown in FIG. 2, the intelligent power server 20 can include: a measurement and control module 201, a protect module 202, a telecontrol module 203 and an exchange module 204.

The measurement and control module 201 can be configured to realize measurement and control over primary devices connected to the merging unit and intelligent terminal integrated devices 30 for all bays 40 in the intelligent substation and the merging unit and intelligent terminal integrated devices 30.

The protect module 202 can be configured to realize protection for the primary devices connected to the merging unit and intelligent terminal integrated devices 30 for all bays 40 in the intelligent substation and the merging unit and intelligent terminal integrated devices 30.

The telecontrol module 203 can be configured to collect measurement and control information and protection information generated in the measurement and control process and the protection process, transmit the information to the operator workstation 10, and execute telecontrol control on the primary devices according to instructions from the operator workstation 10.

The exchange module 204 can be configured to realize data exchange between the merging unit and intelligent terminal integrated devices 30 and devices on the process level, data exchange between the intelligent power server 20 and the devices on the process level, data exchange between the intelligent power server 20 and devices on the station level, data exchange among the devices on the process level and data exchange among the devices on the station level.

Illustratively, the substation system can be divided into a process level and a substation level. On the process level, the merging unit and intelligent terminal integrated devices 30 are set by taking the bays 40 as units. One bay 40 can include a plurality of merging unit and intelligent terminal integrated devices 30, and the bays 40 can include main transformer bays, line bays and bus bays, such as a 110KV main transformer bay, a 35KV main transformer bay, a 10KV main transformer bay and a 110KV PT bay. Optionally, the intelligent power server 20 can be further connected to the operator workstation 10, and the operator workstation 10 is configured to monitor and manage operation of the intelligent substation through the intelligent power server 20. Optionally, the operator workstation 10 can be a monitoring host. Specifically, the intelligent power server 20 and the operator workstation 10 are positioned on the substation level. Each merging unit and intelligent terminal integrated device 30 is directly connected to the intelligent power server 20 through a pair of optical fibers, thereby realizing two-way transmission between the intelligent power server and the merging unit and intelligent terminal integrated device. Each merging unit and intelligent terminal integrated device 30 corresponds to one optical fiber transport port on the intelligent power server 20, and one optical fiber transport port is composed of a reception port and a transmission port. Specifically, the transport ports on the intelligent power server and the merging unit and intelligent terminal integrated devices are in a relationship of one-to-one correspondence, that is, the intelligent power server is connected to one merging unit and intelligent terminal integrated device merely through one transport port, and each merging unit and intelligent terminal integrated device is accessed to one transport port of the intelligent power server only.

Optionally, the measurement and control module 201 can be configured to realize measurement and control over the primary devices connected to the merging unit and intelligent terminal integrated devices 30 for all bays 40 in the intelligent substation and the merging unit and intelligent terminal integrated devices 30. The primary devices can be understood as devices for completing functions of power generation-power transmission-power distribution, such as generators, transformers and the like. Specifically, the merging unit and intelligent terminal integrated devices 30 have merging units and intelligent terminals integrated into one unit, and the merging unit and intelligent terminal integrated devices 30 transmit the SV messages of the merging units to the intelligent power server 20 in a unified manner and similarly transmit the GOOSE messages of the intelligent terminals to the intelligent power server 20 in a unified manner. The measurement and control module 201 of the intelligent power server 20 receives GOOSE messages carrying GOOSE signals including a variety of position or alarm information, processes the received SV messages and GOOSE messages, and transmits GOOSE messages carrying trip signals or control signals to the merging unit and intelligent terminal integrated devices, thereby realizing all the measurement and control of the intelligent substation.

Optionally, the protect module 202 can be configured to realize protection for the primary devices connected to the merging unit and intelligent terminal integrated devices 30 for all the bays 40 in the intelligent substation and the merging unit and intelligent terminal integrated devices 30. The protect module 202 of the intelligent power server 20 receives GOOSE messages carrying protective GOOSE signals such as switch positions and disconnector positions, processes the received SV messages and GOOSE messages, and transmits GOOSE messages carrying protection startup signals or trip signals to the merging unit and intelligent terminal integrated devices, thereby realizing all protections for the intelligent substation.

Optionally, operating principles of the telecontrol module 203 can be as follows: since the intelligent power server 20 is connected to the operator workstation 10, the intelligent power server 20 can further collect measurement and control information and protection information generated in the measurement and control process and the protection process and transmit the information to the operator workstation 10. An operator in the operator workstation 10 can judge an operating state of the primary device according to the received measurement and control information and protection information, and control the primary device according to the operating state of the primary device. Specifically, the intelligent power server 20 executes a telecontrol control over the primary device according to instructions of the operator workstation 10, thereby realizing all the telecontrol function of the intelligent substation.

Further, the intelligent power server 20 can assign IP addresses to the accessed intelligent primary devices, and the intelligent primary devices can include the merging unit and intelligent terminal integrated devices 30, the merging units and the intelligent terminals. A mapping relationship between the media access control (MAC) address and the IP address of each of the intelligent primary devices is stored in the intelligent power server 20. In the process of collecting the measurement and control information and protection information, the intelligent power server 20 replaces the MAC addresses in the measurement and control information and protection information with corresponding IP addresses according to the mapping relationship between the MAC addresses and the IP addresses of the intelligent primary devices, and transmits measurement and control information and protection information carrying the IP addresses to the operator workstation 10.

If the MAC addresses of devices such as a current transformer, a voltage transformer, an operation box and an electric switch can be acquired, the intelligent power server in the disclosure can further assign IP addresses to the devices such as the current transformer, the voltage transformer, the operation box and the electric switch, and save the mapping relationship between the MAC addresses and the IP addresses of these devices.

Illustratively, since the operator workstation 10 can identify the IP addresses of the intelligent primary devices while collection of the measurement and control information and protection information of the primary devices by the intelligent power server 20 is realized in a manner of identifying the MAC addresses of the intelligent primary devices, the intelligent power server 20 can assign IP addresses, which are unique, to the accessed intelligent primary devices, and store the mapping relationship between the MAC addresses and the IP addresses of the intelligent primary devices, thereby forming a mapping table between the MAC addresses and the IP addresses. Based on the mapping relationship, the MAC addresses in the measurement and control information and the protection information are replaced with corresponding IP addresses, and the measurement and control information and collection protection information carrying the IP addresses are transmitted to the operator workstation 10, thereby guaranteeing that the operator in the operator workstation 10 confirms a source address of the measurement and control information and the protection information. The intelligent substation in embodiments of the disclosure assigns unique IP address to the intelligent primary device accessed to the intelligent substation, thereby realizing cloud control and cloud service of the intelligent substation and laying a technical foundation for development of energy big data and energy interne.

Optionally, the exchange module 204 can be configured to realize all exchange functions of the intelligent substation. Specifically, the data exchange between the merging unit and intelligent terminal integrated devices 30 and the devices on the process level, the data exchange between the intelligent power server 20 and the devices on the process level, the data exchange between the intelligent power server 20 and the devices on the station level, the data exchange among the devices on the process level and the data exchange among the devices on the station level can be realized. It should be understood that, the devices on the station level can be an operator workstation and can also be devices which are connected to the intelligent power server 20 and configured to manage and monitor the intelligent substation, such as a monitoring host and a data server.

According to the intelligent power server applied to the protection and control system for an intelligent substation provided by embodiment I of the disclosure, the intelligent power server is directly connected to the merging unit and intelligent terminal integrated devices for all bays in the intelligent substation, and all the merging unit and intelligent terminal integrated devices are connected to the intelligent power server through a pair of optical fibers. The measurement and control module, the protect module, the telecontrol module and the exchange module are integrated and set in the intelligent power server, thereby realizing a centralized setting of all of the measurement and control function, the protection function, the exchange function and the telecontrol function in the intelligent substation, reducing the quantity of the secondary devices in the substation and the floor space of the substation, reducing the difficulty of construction and maintenance of the substation. Therefore, the technical problems of numerous secondary devices, large floor space and high difficulty of construction and maintenance in the related art are solved. Meanwhile, overall of the data exchange between the merging unit and intelligent terminal integrated devices and the substation level is completed by the intelligent power server, no networking is needed on the process level, and no networking is needed on the substation level because the substation level merely has the intelligent power server.

Embodiment II

The intelligent power server in the disclosure realizes centralized modeling by adopting a software-defined function technology and changes an existing decentralized modeling manner of the substation. Specifically, the intelligent substation takes the whole intelligent substation as a modeling object, and adopts the centralized modeling manner of directly adding and updating all of configuration information of the protection function, configuration information of the measurement and control function, configuration information of the exchange function and configuration information of the telecontrol function in substation configuration descriptions.

The centralized modeling manner in the disclosure is as follows: a system configuration description (SCD) tool of the substation system creates SCD files of the intelligent substation according to the merging unit and intelligent terminal integrated devices and each special function planned by the intelligent substation, and configuration information of each of the special functions is set in the SCD files of the intelligent substation. Each special function of the intelligent substation is set according to application scenarios of the intelligent substation. The intelligent power server generates configured intelligent electronic device description (CID) files of the intelligent power server according to the SCD files of the intelligent substation. When in operation, the intelligent power server parses the CID files of the intelligent power server so as to acquire the configuration information of each special function, and realizes all of the measurement and control function, the protection function, the exchange function and the telecontrol function in the intelligent substation according to the configuration information of each special function and the SV messages and GOOSE messages transmitted by the merging unit and intelligent terminal integrated devices.

When the special functions are added or updated in the intelligent substation, configuration information related to the added or updated special functions is set in the SCD files of the intelligent substation, and process level virtual terminators for the added or updated special functions are associated in the SCD files of the intelligent substation.

The measurement and control module is specifically configured to acquire the SV/GOOSE data subscribed from a specified merging unit and intelligent terminal integrated device from corresponding transport port according to a corresponding relationship, defined in the CID files of the measurement and control function, between the measurement and control function and the transport port, and process the subscribed SV/GOOSE data so as to realize measurement and control over the primary devices connected to the specified merging unit and intelligent terminal integrated device and the specified merging unit and intelligent terminal integrated device.

The protect module is specifically configured to acquire the SV/GOOSE data subscribed from the specified merging unit and intelligent terminal integrated device from the corresponding transport port according to a corresponding relationship, defined in the CID files of the protection function, between the protection function and the transport port, and process the subscribed SV/GOOSE data so as to realize protection for the primary devices connected to the specified merging unit and intelligent terminal integrated device and the specified merging unit and intelligent terminal integrated device.

The telecontrol module is specifically configured to collect report information generated by the measurement and control function in the measurement and control process and/or by the protection function in the protection process according to report block contents defined in the CID files of the telecontrol function, convert the MAC addresses of the merging unit and intelligent terminal integrated devices in the report information into the Internet protocol addresses of the merging unit and intelligent terminal integrated devices, and transmit the report information to the devices on the station level.

Illustratively, different special functions are set for different application scenarios of the intelligent substation. The SCD files are created in two modes, one of which is as follows: the SCD file configuration tool directly sets the configuration information of each special function and the configuration information of each merging unit and intelligent terminal in the SCD files, and associates the process level virtual terminators. When demands of the intelligent substation are changed and it is required to add new special functions or update the existing special functions, the SCD file configuration tool directly adds or updates configuration information of the corresponding special functions in the SCD files of the intelligent substation, and directly associates process level virtual terminators of the added or updated special functions in the SCD files. The intelligent power server generates the CID files of the intelligent power server according to the SCD files of the intelligent substation. When in operation, the intelligent power server parses the CID files of the intelligent power server so as to acquire the configuration information of each special function, and realizes all of the protection function, the measurement and control function, the exchange function and the telecontrol function in the intelligent substation according to the configuration information of each special function and the SV messages and GOOSE messages transmitted by the merging unit and intelligent terminal integrated devices.

The other mode of creating the SCD files is as follows: firstly, intelligent electronic device capability description (ICD) files of the intelligent power server are created, and each special function is set in the ICD files of the intelligent power server; then, the SCD file configuration tool generates SCD files of the whole intelligent substation according to the ICD files of the intelligent power server and the ICD files of the merging unit and intelligent terminal integrated devices, and associates process level virtual terminators in the SCD files. The intelligent power server generates the CID files of the intelligent power server according to the SCD files of the intelligent substation. When in operation, the intelligent power server parses the CID files of the intelligent power server so as to acquire the configuration information of each special function, and realizes all of the protection function, the measurement and control function, the exchange function and the telecontrol function in the intelligent substation according to the configuration information of each special function and the SV messages and GOOSE messages transmitted by the merging unit and intelligent terminal integrated devices. When the demands of the intelligent substation are changed and it is needed to add new special functions or update the existing special functions, corresponding special functions are added or updated in the ICD files of the intelligent power server firstly; then the SCD file configuration tool regenerates the SCD files of the whole intelligent substation according to the ICD files of the intelligent power server and the ICD files of the merging unit and intelligent terminal integrated devices, and associates process level virtual terminators in the SCD files.

However, in the related art, each protection apparatus and each measurement and control apparatus are separately modeled. Each apparatus has an ICD file. Then, the ICD file of each apparatus is imported into the SCD tool to conduct unified instance configuration, thereby generating the SCD file of the whole intelligent substation. Then, the contents related to each apparatus in the SCD file are downloaded locally by each apparatus through a special tool so as to form the CID files. Therefore, the existing decentralized modeling manner of the substation is to firstly add individual physical apparatuses and then add functions of each apparatus. As a result, there are numerous secondary devices, and the whole configuration process is complicated and tedious because the ICD files of each secondary device need to be integrated and instantiated to generate the SCD files, and then the contents related to the apparatus, i.e., the CID file, in the SCD file are downloaded to the apparatus by an apparatus generation manufacturer through the special tool.

Embodiment III

Figure 3:
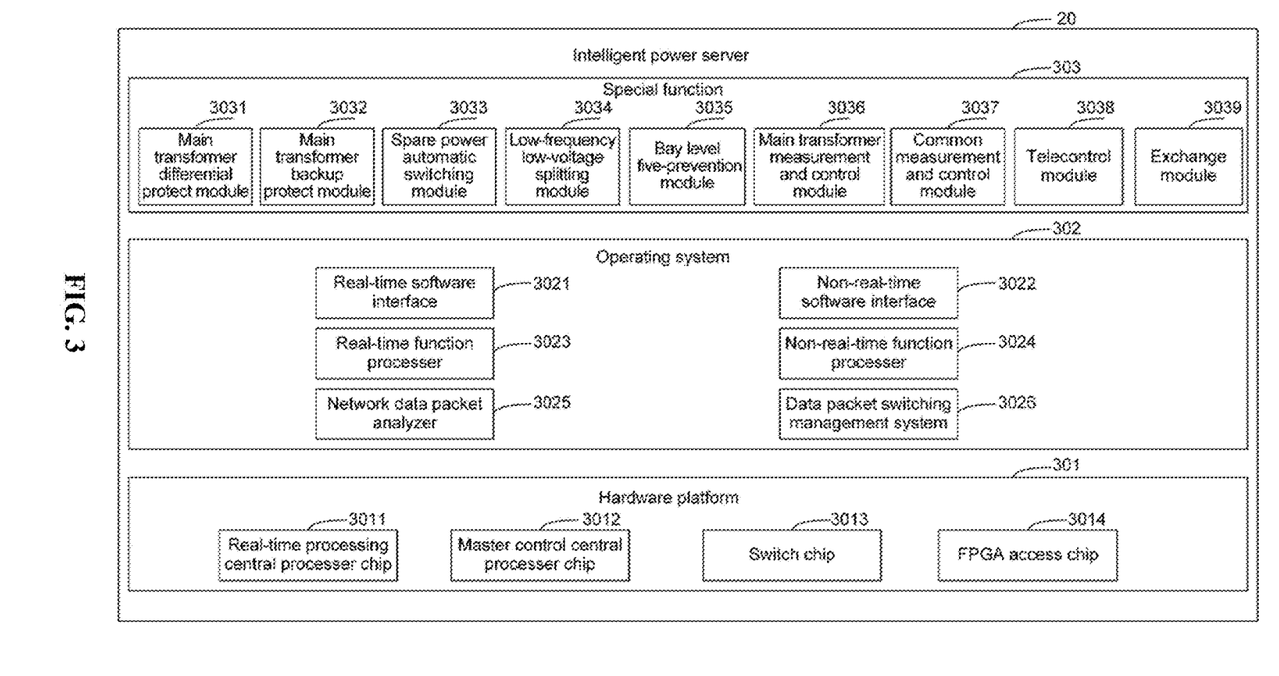
FIG. 3 is a structural schematic diagram illustrating an intelligent power server applied to a protection and control system for an intelligent substation provided by embodiment III of the disclosure.

FIG. 3 is a structural schematic diagram illustrating an intelligent power server applied to a protection and control system for an intelligent substation provided by embodiment III of the disclosure. The intelligent power server can be applied to any intelligent substation. The embodiment is based on the above embodiment, and is improved on the basis of the above embodiment. As shown in FIG. 3, the intelligent power server 20 can include: a hardware platform 301, an operating system 302 and special functions 303, and the operating system 302 is provided on the hardware platform 301.

As shown in FIG. 3, the special functions 303, such as a main transformer differential protect module 3031, a main transformer backup protect module 3032, a spare power automatic switching module 3033, a low-frequency low-voltage splitting module 3034, a bay level five-prevention module 3035, a main transformer measurement and control module 3036, a common measurement and control module 3037, a telecontrol module 3038 and an exchange module 3039, are integrated on the intelligent power server 20. Devices configured to realize the protection function can include: the main transformer differential protect module 3031, the main transformer backup protect module 3032, the spare power automatic switching module 3033, the low-frequency low-voltage splitting module 3034 and the bay level five-prevention module 3035. Devices configured to realize measurement and control services can include: the main transformer measurement and control module 3036 and the common measurement and control module 3037.

Optionally, the hardware platform 301 can include a real-time processing central processer chip 3011, a master control central processer chip 3012, a switch chip 3013 and a field-programmable gate array (FPGA) access chip 3014.

Optionally, the operating system 302 can include a real-time software interface 3021, a non-real-time software interface 3022, a real-time function processer 3023, a non-realtime function processor 3024, a network data packet analyzer 3025 and a data packet switching management system 3026.

Optionally, the special function modules 303 can include the main transformer differential protect module 3031, the main transformer backup protect module 3032, the spare power automatic switching module 3033, the low-frequency low-voltage splitting module 3034, the bay level five-prevention module 3035, the main transformer measurement and control module 3036, the common measurement and control module 3037, the telecontrol module 3038 and the exchange module 3039.

Illustratively, the hardware platform 301 of the intelligent power server 20 can provide hardware support for the intelligent power server 20, and provide necessary hardware access and computing capabilities for the whole function. The operating system 302 of the intelligent power server 20 can provide an embedded linux software platform for the intelligent power server 20 and can further provide operating system support for the special functions 303. The special functions 303 can be installed on the intelligent power server 20, thereby realizing specific special functions.

Further, in the hardware platform 301, the real-time processing central processer chip 3011 can be configured to realize real-time service processing, where the real-time services include: main transformer differential protection, main transformer backup protection, spare power automatic switching, low-frequency low-voltage splitting, bay level five-prevention, main transformer measurement and control and common measurement and control. The master control central processer chip 3012 can be configured to realize non-real-time service processing, where the non-real-time service includes the telecontrol function. The switch chip 3013 can be configured to realize data exchange between the FPGA access chip 3014 and the devices on the process level, data exchange between the master control central processer chip 3012 and the devices on the process level, data exchange among the devices on the process level and data exchange among the devices on the station level. The FPGA access chip 3014 can be configured to receive the SV messages and GOOSE messages transmitted by each merging unit and intelligent terminal integrated device 30 in real time, perform SV processing or GOOSE processing on the received messages and then transmit the messages to the real-time processing central processer chip 3011 to realize special function processing, and transmit GOOSE messages to the merging unit and intelligent terminal integrated devices 30 according to the processing results of the real-time processing central processer chip 3011.

Illustratively, the real-time processing central processer chip 3011 is served as a real-time processing chip, and can be configured to realize reception and analysis of real-time GOOSE messages and SV messages, perform real-time computing functions on the GOOSE messages and SV messages and generate GOOSE messages in real time according to computing results. The real-time processing central processer chip 3011 can be further configured to manage the FPGA access chip 3014 and an alarm function chip and save real-time message data when power of the intelligent power server 20 is cut off. The master control CPU chip 3012 is served as a non-real-time processing chip, and can be used in a master control processor, thereby realizing management of each device in the device; and can be further configured to control non-real-time software operation, externally provide a management serial port, a management Internet port and a dispatching serial port and save real-time report information when the power of the intelligent power server 20 is cut off. The switch chip 3013 is served as a station level dispatch interface, and can be configured to realize data exchange and access of the devices on the process level (a process level exchange service interface, connected to a process level network), realize data exchange and access of the devices on the station level (a station level exchange service interface, connected to a station level network), realize data exchange between the FPGA access chip 3014 inside the device and the devices on the process level and realize data exchange between the master control central processor chip 3012 and external devices of the intelligent power server 20. The processing results of the master control central processor chip 3012 are transmitted to the station level devices in the form of a report. Optionally, the external devices may be devices on the process level, devices on the bay level and devices on the station level. The devices on the process level may be the merging unit and intelligent terminal integrated devices 30, fault recording systems and recording and analyzing systems. The FPGA access chip 3014 can externally provide 16 100M Ethernet optical ports (merging unit and intelligent terminal integrated device service interfaces) and is configured to access the merging unit and intelligent terminal integrated devices 30. The FPGA access chip can further be served as an Ethernet data real-time access processer in the process level, so as to receive the GOOSE and SV messages transmitted by the merging unit and intelligent terminal integrated devices 30 in real time, extract the message contents, and transmit the extracted message contents to the real-time processing central processer chip 3011 for performing real-time data processing through two Gigabit network ports, and transmit the GOOSE messages to the corresponding merging unit and intelligent terminal integrated devices 30 through the 16 100M Ethernet optical ports according to the computing results of the real-time processing central processer chip 3011. The FPGA access chip can also duplicate the received GOOSE and SV messages and the transmitted GOOSE messages to the exchange module according to configuration and transmit the messages to the devices on the process level through the exchange module, the devices on the process level may be a fault recording device, an analyzing and recording device and the like. The FPGA access chip 3014 can be further externally connected to a warning device.

Figure 4:
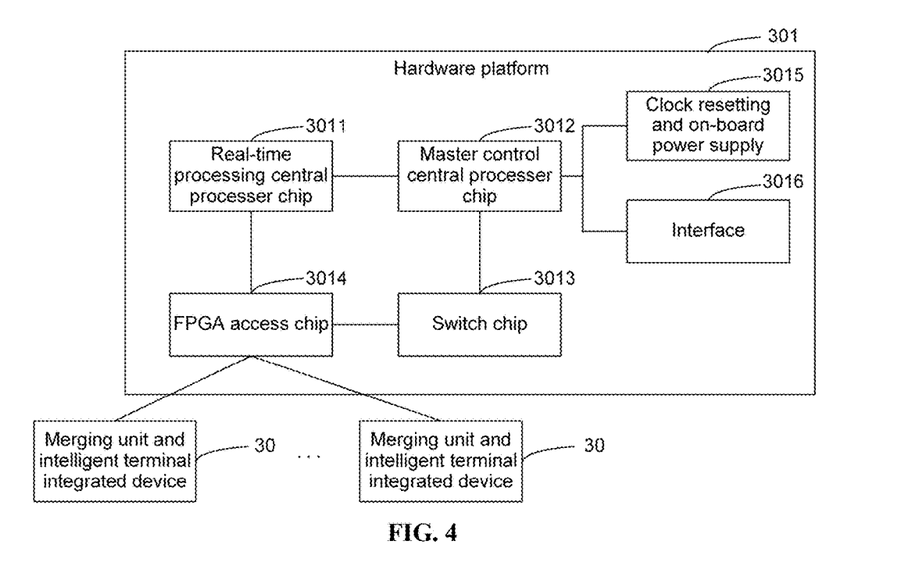
FIG. 4 is a structural schematic diagram illustrating a hardware platform in an intelligent power server applied to a protection and control system for an intelligent substation provided by embodiment III of the disclosure.

Optionally, as shown in FIG. 4, the hardware platform 301 is composed of the real-time processing central processer chip 3011, the master control central processer chip 3012, the switch chip 3013 and the FPGA access chip 3014. The real-time processing central processer chip 3011 is connected to the master control central processer chip 3012 and the FPGA access chip 3014 through connecting cables, and the master control central processer chip 3012 and the FPGA access chip 3014 are further respectively connected to the switch chip 3013. The hardware platform 301 can further include a clock resetting and on-board power supply 3015 and an interface 3016, and the clock resetting and on-board power supply 3015 and the interface 3016 are respectively connected to the master control central processer chip 3012. Specifically, the clock resetting and on-board power supply can be configured to realize resetting of various devices and chips in the intelligent substation and provide a reference clock for each function in the hardware platform 301, thereby realizing a function of synchronizing the Ethernet and 1588, realizing conversion from a 12V power supply to a power supply required by each chip of the hardware platform 301, and realizing monitoring of a system state and monitoring of a power state. The interface can be configured to implement optical coupling input and output interfaces, implement relay dry contact input and output, implement 100BASE-FX and 100BASE-X SFP interfaces, implement RJ45 interface signal isolation and protection and realize RS232 interface level conversion.

Optionally, the real-time processing central processer chip 3011 and the master control central processer chip 3012 can be T1040 high-performance multi-core processor chips of Freescale Corporation.

Further, in the operating system 302, the real-time software interface 3021 and the non-real-time software interface 3022 can provide data interfaces for each special function module 303; the real-time function processer 3023 and the non-real-time function processer 3024 can configure corresponding processing strategies for each special function 303 in a software defined manner, and the real-time function processer 3023 can be further configured to perform floating-point arithmetic processing and GOOSE and SV message processing; and the network data packet analyzer 3025 and the data packet switching management system 3026 can parse the GOOSE messages and SV messages and further parse the generated GOOSE messages.

Optionally, the operating system 302 can further include a real-time linux platform, a security feature and a device and network management system.

Further, in the special functions 303, the main transformer differential protect module 3031 can be configured to prevent the primary devices from being subjected to protection misoperation caused by an influence of unbalanced current; the main transformer backup protect module 3032 can be configured to protect the primary devices by adopting backup protection in the case that main protection malfunctions and fails to act; the spare power automatic switching module 3033 can be configured to, after signals being collected in an AC uninterrupted sampling manner, perform Fourier calculation in real time to accurately determine the power state and delay to switch the power supply; the low-frequency low-voltage splitting module 3034 can be configured to remove secondary loads when output of the generator is insufficient or the system capacity is low, so as to guarantee safety operation of important loads and guarantee steady operation of the generator; the bay level five-prevention module 3035 can be understood to be configured to, depending on a monitoring network of the intelligent power server 20 and the intelligent substation, download a blocking logic to the intelligent power server 20 through management software according to a five-prevention logic of a computer-based five-prevention system on the intelligent power server 20, so as to realize logic five-prevention functions of the operation of the intelligent power server 20. Specifically, the five-preventions refer to: (1) prevention of mistaken disconnection/connection of circuit breakers, (2) prevention of disconnection/connection of an isolating switch when it is in on-load operation, (3) prevention of disconnection (connection) of ground leads (ground disconnectors) when it is powered, (4) prevention of connection of circuit breakers (isolating switches) with ground leads (ground disconnectors), and (5) prevention of mistaken entry of charged bays. The main transformer measurement and control module 3036 can be configured to match corresponding main transformer measurement and control processing strategies according to the contents of messages and process the messages according to the matched main transformer measurement and control processing strategies; the common measurement and control module 3037 can be configured to match with a corresponding main common measurement and control processing strategy according to contents of the messages and process the messages according to the matched common measurement and control processing strategy; the telecontrol module 3038 can be configured to realize telecontrol control over the primary devices and realize all of telecontrol services of the intelligent substation; and the exchange module 3039 can be configured to realize all the exchange functions of the intelligent substation, such as the data exchange between the intelligent power server 20 and the devices on the process level, the data exchange among the devices of the process level, and the data exchange among the devices of the station level.

Optionally, the intelligent power server 20 can further include the following special function modules: a fault recording module and a network analyzing and recording module; and/or the intelligent power server 20 can further include a firewall module connected to a regional dispatching center.

Illustratively, the fault recording module can be configured to automatically and accurately record change conditions of various electrical quantities before, after and during the fault when the intelligent substation system malfunctions. When there exists faults on the primary devices, maintenance personnel can be helped, with the fault recording module, to know operating conditions of the primary devices upon the faults occurs through the change conditions of the various electrical quantities before, after and during the faults, and are helped to perform maintenance work in time.

Illustratively, the network analyzing and recording module can be configured to automatically analyze and record the operating states of the primary devices so as to obtain state parameters of the primary devices. Through the network analyzer and recording function, the operator can be helped to timely know the operating conditions of the primary devices and pre-judge and solve possible faults in time.

Illustratively, the firewall module can be configured to prevent attack of an Extranet, so as to guarantee that the intelligent power server is prevented from being attacked by the Extranet. Further, the regional dispatching center may be a local dispatching center, a county dispatching center or a distribution center.

Optionally, the intelligent power server 20 can further include a power-down protecting module, configured to provide a power-down protection function for fault recording data, event sequence recording data and action reports.

Illustratively, the server may be suddenly powered off in the operating process due to an abnormal condition. In order to prevent data loss of the fault recording module in a recording process, the power-down protecting module can save the fault recording data and the event sequence recording data under the power-down condition. Similarly, the special functions 303 will report action events to the devices on the station level in the operating process. In order to avoid loss of the action report data before power-down, the power-down protecting module can save the action report data under the power-down condition.

According to the intelligent power server applied to the protection and control system for the intelligent substation provided by the embodiment, the operating system is provided on the hardware platform, and the processing strategies are provided for the special functions through the operating system, so that the processing speed of various special functions can be improved. All of the special functions can be modeled together on the intelligent power server, the modeling manner is simple, and modeling capability of the whole substation system can be improved. Meanwhile, the special functions of the intelligent power server are modularized, thereby guaranteeing that all of the measurement and control function, the protection function, the exchange function and the telecontrol function in the intelligent substation are set in a centralized manner, further reducing modification of the intelligent power server as much as possible while performing function upgrading on the intelligent power server with continuous development of the substation technology, shortening upgrading time and reducing upgrading complexity.

Optionally, the merging unit and intelligent terminal integrated devices 30 for all bays in the intelligent substation are respectively accessed to the corresponding transport ports of the FPGA access chip of the intelligent power server 20, and the merging unit and intelligent terminal integrated devices 30 and the transport ports are in a relationship of one-to-one correspondence. Message transmission between the merging unit and intelligent terminal integrated devices 30 and the intelligent power server 20 is realized by the transport ports provided by the FPGA access chip, so that time delay in the message transmission and reception process can be shortened, and real-time property of the message transmission is improved.

Optionally, the intelligent power server 20 is further provided with an extensible markup language (XML) database that is configured to record the data messages transmitted by the merging unit and intelligent terminal integrated devices 30, and sort and store the data messages according to the bays 40 to which the merging unit and intelligent terminal integrated devices 30 (which transmit the data messages) belong, the merging unit and intelligent terminal integrated devices 30 and message types of the data messages.

Illustratively, primary nodes in tree-structured documents of the XML database refer to the bays 40, secondary nodes connected to the primary nodes refer to the merging unit and intelligent terminal integrated devices 30 under the bays 40, and third-level nodes connected to the secondary nodes refer to all the message types of the messages transmitted by the merging unit and intelligent terminal integrated devices 30, including the SV messages and the GOOSE messages. The bay where a message sender is positioned and which merging unit and intelligent terminal integrated device is the sender can be determined by parsing the source addresses of the messages. The XML database can sort and store the data messages according to node types, thereby providing support for the fault recording function and the network analyzing and recording function.

It should be noted that, the above descriptions are only optional embodiments and used technical principles of the disclosure. Those skilled in the art may understand that the disclosure is not limited to specific embodiments herein, and those skilled in the art may carry out various apparent modifications, readjustments and replacements without departing from the protection scope of the disclosure. Therefore, although the disclosure is described in details through the above embodiments, the disclosure is not limited to the above embodiments, and also can include more other equivalent embodiments without departing from the conception of the disclosure, while the scope of the disclosure is determined by the scope of the attached claims.

What is claimed is:

1. An intelligent power server applied to a protection and control system for an intelligent substation, wherein merging unit and intelligent terminal integrated devices for all bays in the intelligent substation are directly accessed to the intelligent power server, each of the merging unit and intelligent terminal integrated devices is accessed to one of transport ports on the intelligent power server through an embedded high-bandwidth switched communication network, and the intelligent power server comprises a central processer chip, a switch chip and a storage device storing computer instructions which, when being executed, cause the central processer chip to implement functions of the following modules:
a measurement and control module, configured to realize measurement and control over primary devices connected to the merging unit and intelligent terminal integrated devices for all bays in the intelligent substation and the merging unit and intelligent terminal integrated devices;
a protect module, configured to realize protection for the primary devices connected to the merging unit and intelligent terminal integrated devices for all bays in the intelligent substation and the merging unit and intelligent terminal integrated devices; and
a telecontrol module, configured to collect measurement and control information and protection information generated in a measurement and control process and a protection process, transmit the measurement and control information and the protection information to an operator workstation, and execute a telecontrol control on the primary devices according to instructions from the operator workstation;
wherein the switch chip is connected to the central processer chip, and is caused to implement functions of the following module when the computer instructions are executed:
an exchange module, configured to realize data exchange between the merging unit and intelligent terminal integrated devices and devices on a process level, data exchange between the intelligent power server and the devices on the process level, data exchange between the intelligent power server and devices on a station level, data exchange among the devices on the process level and data exchange among the devices on the station level.

2. The intelligent power server according to claim 1, wherein the intelligent substation adopts a centralized modeling manner of directly adding and updating configuration information of a protection function, configuration information of a measurement and control function, configuration information of an exchange function and configuration information of a telecontrol function in substation configuration descriptions (SCD) files by taking the whole intelligent substation as a modeling object.

3. The intelligent power server according to claim 2, wherein the SCD files of the intelligent substation are created based on the merging unit and intelligent terminal integrated devices and special functions planned by the intelligent substation, and configuration information of each of the special functions is defined in the SCD files of the intelligent substation, wherein the special functions are set according to application scenarios of the intelligent substation;
wherein the measurement and control module is specifically configured to, based on a corresponding relationship between the measurement and control function defined in the configuration information of the measurement and control function and the transport port, acquire sampled value (SV)/generic object oriented substation event (GOOSE) data subscribed from a specified merging unit and intelligent terminal integrated device from a corresponding transport port, and process the subscribed SV/GOOSE data, so as to realize measurement and control over the primary devices connected to the specified merging unit and intelligent terminal integrated device and the specified merging unit and intelligent terminal integrated device, wherein configured intelligent electronic device description (CID) files of the intelligent power server are generated based on the SCD files, and comprise the configuration information of the measurement and control function.

4. The intelligent power server according to claim 2, wherein the SCD files of the intelligent substation are created based on the merging unit and intelligent terminal integrated devices and special functions planned by the intelligent substation, and configuration information of each of the special functions is defined in the SCD files of the intelligent substation, wherein the special functions are set according to application scenarios of the intelligent substation;

wherein the protect module is specifically configured to, based on a corresponding relationship between the protection function defined in the configuration information of the protection function and the transport port, acquire sampled value (SV)/generic object oriented substation event (GOOSE) data subscribed from the specified merging unit and intelligent terminal integrated device from the corresponding transport port, and process the subscribed SV/GOOSE data, so as to realize protection for the primary devices connected to the specified merging unit and intelligent terminal integrated device and the specified merging unit and intelligent terminal integrated device, wherein configured intelligent electronic device description (CID) files of the intelligent power server are generated based on the SCD files, and comprise the configuration information of the protection function.

5. The intelligent power server according to claim 2, wherein the SCD files of the intelligent substation are created based on the merging unit and intelligent terminal integrated devices and special functions planned by the intelligent substation, and configuration information of each of the special functions is defined in the SCD files of the intelligent substation, wherein the special functions are set according to application scenarios of the intelligent substation;

wherein the telecontrol module is specifically configured to, based on contents of a report block defined in the configuration information of the telecontrol function, collect report information generated by the measurement and control function in the measurement and control process and/or generated by the protection function in the protection process, convert media access control (MAC) addresses of the merging unit and intelligent terminal integrated devices in the report information to Internet protocol addresses of the merging unit and intelligent terminal integrated devices, and transmit the report information to the devices on the station level, wherein configured intelligent electronic device description (CID) files of the intelligent power server are generated based on the SCD files, and comprise the configuration information of the telecontrol module function.

6. The intelligent power server according to claim 3, wherein the central processor chip comprises a real-time processing central processer chip and a master control central processer chip, and a hardware platform of the intelligent power server further comprises a field-programmable gate array (FPGA) access chip;

wherein the real-time processing central processer chip is configured to realize real-time services processing, wherein the real-time services comprise: main transformer differential protection, main transformer backup protection, spare power automatic switching, low-frequency low-voltage splitting, bay level five-prevention, main transformer measurement and control and common measurement and control;

the master control central processer chip is configured to realize non-real-time services processing, wherein the non-real-time services comprise the telecontrol function;

the switch chip is configured to realize data exchange between the FPGA access chip and the devices on the process level, data exchange between the master control central processer chip and the devices on the process level, data exchange among the devices on the process level and data exchange among the devices on the station level; and the FPGA access chip is configured to receive the sampled value (SV) messages and the generic object oriented substation event (GOOSE) messages transmitted by each of the merging unit and intelligent terminal integrated devices in real time, and transmit the received messages, after being subjected to a SV processing or GOOSE processing, to the real-time processing central processer chip so as to realize special function processing, and transmit GOOSE messages to the merging unit and intelligent terminal integrated devices according to processing results of the real-time processing central processer chip, and the FPGA access chip is further configured to duplicate the received SV messages and GOOSE messages into the switch chip and transmit the messages to a process level network through the switch chip.

7. The intelligent power server according to claim 6, wherein the merging unit and intelligent terminal integrated devices for all bays in the intelligent substation are respectively accessed to the transport ports of the FPGA access chip on the intelligent power server, each of the merging unit and intelligent terminal integrated devices is accessed to one of the transport ports on the FPGA access chip merely through one physical link, and the merging unit and intelligent terminal integrated devices and the transport ports on the FPGA access chip are in a relationship of one-to-one correspondence.

8. The intelligent power server according to claim 1, wherein the intelligent power server is further provided with an extensible markup language (XML) database, the XML database is configured to record data messages transmitted by the merging unit and intelligent terminal integrated devices, and sort and store the data messages according to bays to which the merging unit and intelligent terminal integrated devices transmitting the data messages belong, the merging unit and intelligent terminal integrated devices and message types.

9. The intelligent power server according to claim 2, wherein the intelligent power server is further provided with an extensible markup language (XML) database, the XML database is configured to record data messages transmitted by the merging unit and intelligent terminal integrated devices, and sort and store the data messages according to bays to which the merging unit and intelligent terminal integrated devices transmitting the data messages belong, the merging unit and intelligent terminal integrated devices and message types.

10. The intelligent power server according to claim 3, wherein the intelligent power server assigns IP addresses to accessed intelligent primary devices, and the intelligent primary devices comprise the merging unit and intelligent terminal integrated devices, merging units and intelligent terminals, and a mapping relationship between the MAC address and the IP address of each of the intelligent primary devices is stored in the intelligent power server.

11. The intelligent power server according to claim 10, wherein the telecontrol module is further configured to, during a process of collecting the measurement and control information and the protection information, replace the MAC address in the measurement and control information and the protection information with corresponding IP address based on the mapping relationship between the MAC address and the IP address of the intelligent primary device, and transmit the measurement and control information and the protection information carried with the IP address to the operator workstation.

12. The intelligent power server according to claim 1, wherein the central processer chip is further caused to implement functions of the following modules when the computer instructions are executed: a fault recording module and a network analyzing and recording module.

13. The intelligent power server according to claim 1, wherein the central processer chip is further caused to implement functions of the following module when the computer instructions are executed: a firewall module connected to a regional dispatching center.

14. The intelligent power server according to claim 2, wherein the central processer chip is further caused to implement functions of the following modules when the computer instructions are executed: a fault recording module and a network analyzing and recording module.

15. The intelligent power server according to claim 2, wherein the central processer chip is further caused to implement functions of the following module when the computer instructions are executed: a firewall module connected to a regional dispatching center.

16. The intelligent power server according to claim 12, wherein the central processer chip is further caused to implement functions of the following module: a power-down protecting module, configured to provide a power-down protection function for fault recording data, event sequence recording data and action reports.

* * * * *